United States Patent
Nammi

(10) Patent No.: US 10,715,273 B2
(45) Date of Patent: Jul. 14, 2020

(54) JOINT CHANNEL ESTIMATION AND DATA DETECTION TECHNIQUE TO DECODE 5G UPLINK CONTROL CHANNEL

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 99 days.

(21) Appl. No.: 16/142,277

(22) Filed: Sep. 26, 2018

(65) Prior Publication Data

US 2020/0099466 A1 Mar. 26, 2020

(51) Int. Cl.
*H04L 1/00* (2006.01)
*H04L 5/00* (2006.01)
(Continued)

(52) U.S. Cl.
CPC .......... *H04L 1/0009* (2013.01); *H04L 1/1812* (2013.01); *H04L 5/0094* (2013.01); *H04W 76/27* (2018.02)

(58) Field of Classification Search
CPC ... H04L 1/0009; H04L 5/0094; H04L 1/1812; H04W 76/27
See application file for complete search history.

(56) References Cited

U.S. PATENT DOCUMENTS 8,060,801 B2 11/2011 Seol et al.
9,554,374 B2 1/2017 Han et al.
(Continued)

FOREIGN PATENT DOCUMENTS

EP 3346629 A1 7/2018
WO WO-2009035233 A1 * 3/2009 ........... H04L 1/0081
(Continued)

OTHER PUBLICATIONS

Matsumura et al., 5G New RAT Uplink Control Channel for Small Payloads. Dec. 1, 2017. 11th International Conference on Signal Processing and Communication Systems (ICSPCS), pp. 1-5, <DOI: 10.1109/ICSPCS.2017.8270488>. (Year: 2017).*

(Continued)

*Primary Examiner* — Omar J Ghowrwal
(74) *Attorney, Agent, or Firm* — Amin, Turocy & Watson, LLP

(57) ABSTRACT

A joint channel estimation and data detection technique for decoding an uplink control channel using resource elements that are redundant in acknowledgement and negative acknowledgement uplink control channel transmissions is disclosed. To improve the performance of a decoder, channel estimation can be performed using reference signals (pilot symbols) to determine the characteristics of a channel at given locations within a subframe. For some uplink control channel formats, however, there aren't dedicated locations for reference signals/symbols, and so channel estimation is not performed. Since the acknowledgement and negative acknowledgement resource elements may be identical, at identical locations within the two different types of messages, the mobile device can replace the resource elements at the redundant locations with reference signals, thus the receiver can perform channel estimation using the reference signals, which can improve the performance of decoding the rest of the acknowledgement, negative acknowledgement transmission.

20 Claims, 10 Drawing Sheets

(51) Int. Cl.
*H04L 1/18* (2006.01)
*H04W 76/27* (2018.01)

(56) References Cited

U.S. PATENT DOCUMENTS

| | | | |
|---|---|---|---|
| 9,887,823 B2 | 2/2018 | Chae et al. | |
| 2009/0022135 A1* | 1/2009 | Papasakellariou | H04L 23/02 370/344 |
| 2010/0005357 A1* | 1/2010 | Sun | H04L 1/0625 714/749 |
| 2010/0048219 A1* | 2/2010 | Fukuoka | H04W 72/0406 455/450 |
| 2010/0124195 A1* | 5/2010 | Chun | H04L 1/0028 370/329 |
| 2016/0226645 A1 | 8/2016 | Kim et al. | |
| 2017/0086219 A1 | 3/2017 | Lee et al. | |
| 2017/0280454 A1 | 9/2017 | Kusashima et al. | |
| 2017/0310447 A1 | 10/2017 | Kusashima et al. | |
| 2018/0034610 A1 | 2/2018 | He et al. | |
| 2018/0054282 A1 | 2/2018 | Wang et al. | |
| 2018/0054285 A1 | 2/2018 | Chen et al. | |
| 2018/0076917 A1 | 3/2018 | Pan et al. | |
| 2018/0124815 A1 | 5/2018 | Papasakellariou | |
| 2018/0139014 A1 | 5/2018 | Xiong et al. | |
| 2018/0167932 A1 | 6/2018 | Papasakellariou | |
| 2018/0262304 A1 | 9/2018 | Wang et al. | |
| 2018/0262316 A1 | 9/2018 | Wang et al. | |
| 2018/0263030 A1 | 9/2018 | Kim et al. | |
| 2019/0320344 A1* | 10/2019 | Matsumura | H04L 1/16 |

FOREIGN PATENT DOCUMENTS

| | | |
|---|---|---|
| WO | 2017146756 A1 | 8/2017 |
| WO | 2017196387 A1 | 11/2017 |
| WO | 2018082693 A1 | 5/2018 |
| WO | 2018103002 A1 | 6/2018 |
| WO | 2018128474 A1 | 7/2018 |
| WO | 2018160117 A1 | 9/2018 |
| WO | 2018175801 A1 | 9/2018 |

OTHER PUBLICATIONS

Cipriano, Antonio Maria, et al. "Cooperative communications with HARQ in a Wireless Mesh Network Based on 3GPP LTE." Signal Processing Conference (EUSIPCO), 2012 Proceedings of the 20th European, IEEE, 2012. 5 pages. https://www.eurasip.org/Proceedings/Eusi pco/Eusipco20 12/Conference/papers/1569588813.pdf.

Delgado, Ramon A., et al. "Fast Convergence Outer Loop Link Adaptation With Infrequent Updates in Steady State." Vehicular Technology Conference (VTC-Fall), 2017 IEEE 86th, IEEE, 2017. 5 pages. http://www.radelgado.com/papers/delgado20 17fast_with_ footnote. pdf.

Kim, Dongmyoung, et al. "A MAC/PHY Cross-Layer Design for Efficient ARQ Protocols." IEEE Communications letters Dec. 12, 2008: 909-911. 3 pages. http://www.mwnl.snu.ac.kr/ ... schoi/ publication/Journals/08-CI-kim . pdf.

International Search Report and Written Opinion dated Nov. 21, 2019 for PCT Application No. PCT/US2019/047583, 16 pages.

NTT DOCOMO, Inc. et al. "Short-PUCCH for UCI of up to 2 bits" 3GPP Draft; R1-1716098, 3rd Generation Partnership Project (3GPP), vol. RAN WG1, no Nagoya, Japan, Sep. 18-21, 2017. [http://www.3gpp.org/ftp/Meetings_3GPP_SYNC/RAN1/Docs/], 16 pages.

\* cited by examiner

US 10,715,273 B2

JOINT CHANNEL ESTIMATION AND DATA DETECTION TECHNIQUE TO DECODE 5G UPLINK CONTROL CHANNEL

TECHNICAL FIELD

The present application relates generally to the field of mobile communications and, for example, to a joint channel estimation and data detection technique to decode an uplink control channel in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
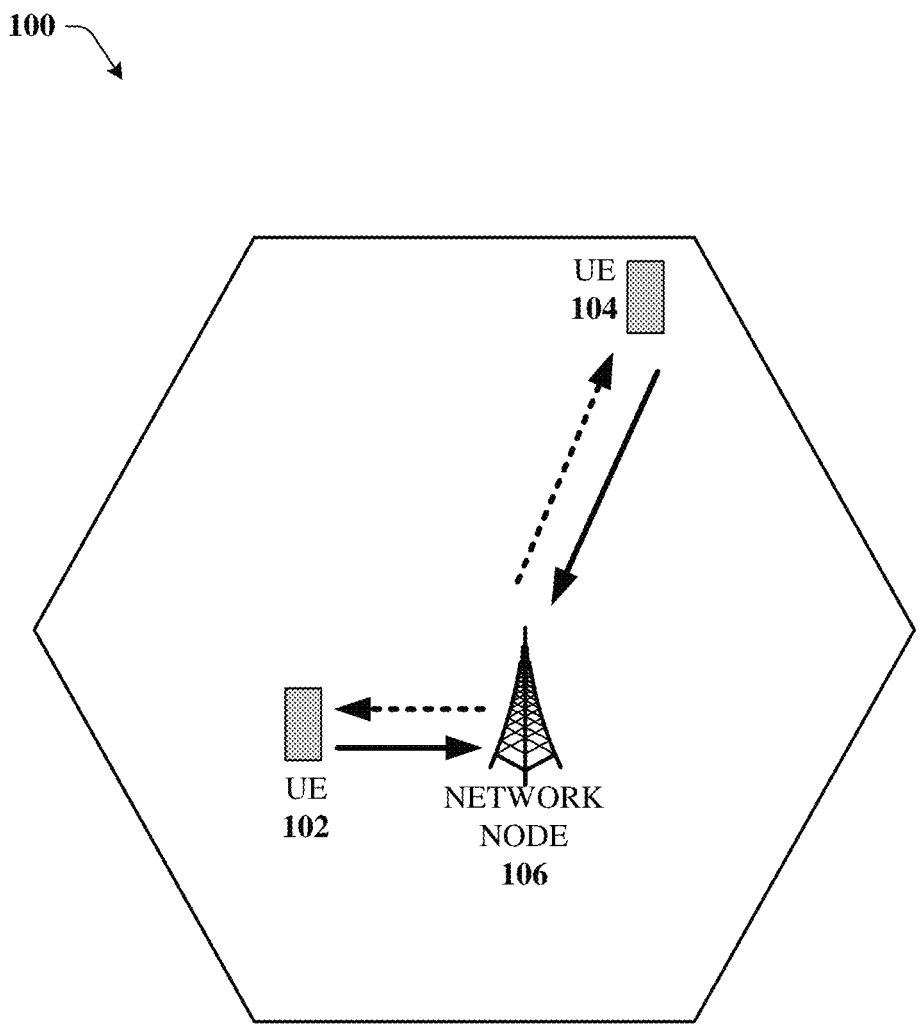
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for performing joint channel estimation and data detection for decoding an uplink control channel using resource elements that are redundant in acknowledgement and negative acknowledgement uplink control channel transmissions. To improve the performance of a decoder, channel estimation can be performed using reference signals (pilot symbols) to determine the characteristics of a channel at given locations within a subframe. For some uplink control channel formats, however, there are no dedicated locations for reference signals/symbols, and so channel estimation is not performed. Since the acknowledgement and negative acknowledgement resource elements may be identical, at identical locations within the two different types of messages, the mobile device can replace the resource elements at the redundant locations with reference signals, thus the receiver can perform channel estimation using the reference signals, which can improve the performance of decoding the rest of the acknowledgement, negative acknowledgement transmission.

In various embodiments a user equipment device can comprise a processor and a memory that stores executable instructions that, when executed by the processor, facilitate performance of operations. The operations can include receiving, from a network node device, a first sequence to facilitate signaling a hybrid automatic repeat request acknowledgement and a second sequence to facilitate signaling a hybrid automatic repeat request negative acknowledgement, wherein the first sequence comprises a first subcarrier symbol that matches a second subcarrier symbol of the second sequence. The operations can also include determining to transmit the hybrid automatic repeat request acknowledgement to the network node device in response to receiving a data transmission from the network node device. The operations can also include configuring the first subcarrier symbol as a first reference symbol. The operations can also include transmitting the hybrid automatic repeat request acknowledgement to the network node device.

In another embodiment, a network node device can comprise a processor and a memory that stores executable instructions that, when executed by the processor, facilitate performance of operations. The operations can include configuring a user equipment device to report a first sequence of subcarrier symbols corresponding to an acknowledgment that data was received successfully and to report a second sequence of subcarrier symbols corresponding to a negative acknowledgement that data was not received successfully, wherein the first sequence and the second sequence comprise a matching subcarrier symbol at a same location in both the first sequence and the second sequence. The operations can also include performing channel estimation on a transmission received via uplink control channel based on a reference symbol at the location of the matching subcarrier symbol. The operations can also include, based on a result of the channel estimation, decoding the transmission.

In another embodiment, a method comprises receiving, by a network node device comprising a processor, an uplink control channel transmission from a mobile device. The method also comprises facilitating, by the network node device, channel estimation of the uplink control channel transmission based on a subcarrier symbol at a defined location, wherein the defined location corresponds to a matching subcarrier symbol in both a first sequence corresponding to a hybrid automatic repeat request acknowledgement, and a second sequence corresponding to a hybrid automatic repeat request negative acknowledgement. The method also comprises decoding, by the network node device, the uplink control channel transmission based on a result of the channel estimation.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (WI-FITn, global system for mobile communications (GSM), universal mobile telecommunications system (UMTS), worldwide interoperability for microwave access (WIMAX™), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-WAVErm, ZIGBEE™ and other 802.XX wireless technologies and/or legacy telecommunication technologies.

In some embodiments the non-limiting term radio network node or simply network node is used. It refers to any type of network node that serves UE and/or connected to other network node or network element or any radio node from where UE receives signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc.

The embodiments are described in particular for NR. The embodiments are however applicable to any RAT or multi-RAT system where the UE operates using multiple carriers e.g. LTE FDD/TDD, GSM/GERAN, WI-FI™, WLAN, WIMAX™, CDMA2000 etc.

The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Note that the embodiments disclosed herein apply equally for Multi RAB (radio bearers) on some carriers (that is data plus speech is simultaneously scheduled).

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 and UE 104 and 102 can use the joint channel estimation and data detection technique disclosed herein to improve the performance of decoding uplink control channel from the UEs 102 and 104 to the network node 106. In an embodiment the uplink control channels can include hybrid automatic repeat request acknowledgement (HARQ-ACK) or negative acknowledgements (HARQ-NACK) indicating whether a data channel was received and decoded successfully or unsuccessfully (respectively) from the network node 106.

NR, or 5G, defines 5 Physical Uplink Control Channel formats, Formats 0-4. Formats 0 and 1 are formats that signal HARQ-ACK/NACK without having space for dedicated reference signals in order to facilitate channel estimation. Format 0 and Format 1 each of which conveys equal to or less than 2 bits of information. Format 0 is a short PUCCH with 1-2 symbols, while Format 1 is a long PUCCH with between 4 and 14 symbols.

When transmitting the HARQ-ACK using a PUCCH format 0 or 1, the UE will transmit a sequence of numbers, the sequence being a CAZAC sequence which is a constant amplitude zero-autocorrelation waveform sequence of a sequence of numbers. Each set of numbers can correspond to a sub-carrier symbol or resource element of the uplink control channel transmission. As an example, the sequence for HARQ-ACK may be:

[−0.7071−0.7071i
−0.9659+0.2588i
0.9659+0.2588i
0.7071−0.7071i
−0.2588−0.9659i
0.9659+0.2588i
−0.7071−0.7071i
0.9659−0.2588i 0.2588−0.9659i
0.7071+0.7071i
−0.9659+0.2588i
−0.9659−0.2588i];
While the CAZAC sequence used for HARQ-NAK is [−0.7071−0.7071i
0.9659−0.2588i
0.9659+0.2588i
−0.7071+0.7071i
−0.2588−0.9659i
−0.9659−0.2588i
−0.7071−0.7071i
−0.9659+0.2588i
0.2588−0.9659i
−0.7071−0.7071i
−0.9659+0.2588i
0.9659+0.2588i]

As can be seen, in each sequence, the odd numbered elements of the HARQ-ACK match the odd numbered elements of HARQ-NACK. Since the elements are the same in both the HARQ ACK and NACK transmissions, the UE 102 or 104 can instead replace those elements with reference signal elements that can facilitate the network node 106 to use the reference signal elements to perform channel estimation, which can then improve the data decoding of the uplink control channel, which can allow the UE 102 or 104 to reduce the power output for the same decoding rate.

Conventional receivers use correlation between these sequences and determine whether UE 102 or 104 transmitted HARQ-ACK or HARQ-NAK for the corresponding PDSCH (Physical Downlink Shared Channel) transmission. In an embodiment, the network node 106 can configure the UE 102 and 104 with sequences such that there is an overlap of symbols between the two hypothesis such as HARQ-ACK and HARQ-NAK. Since some of the entries in the CAZAC sequence are common between these sequences the network can use these symbols to estimate the channel. Once it estimate the channel, the network node 106 can use coherent detection to determine whether the UE transmitted HARQ-ACK or HARQ-NAK, thereby improving the performance of the NR uplink control channel. Using the joint channel estimation can allow for improved detection capability for the uplink control channel thereby achieving a gain in block error rate for PUCCH format 0 and 1. This in turn improves the NR coverage which allows for a robust performance of the UL control channel even at low SINR (signal to interference plus noise ratio) conditions.

Figure 2:
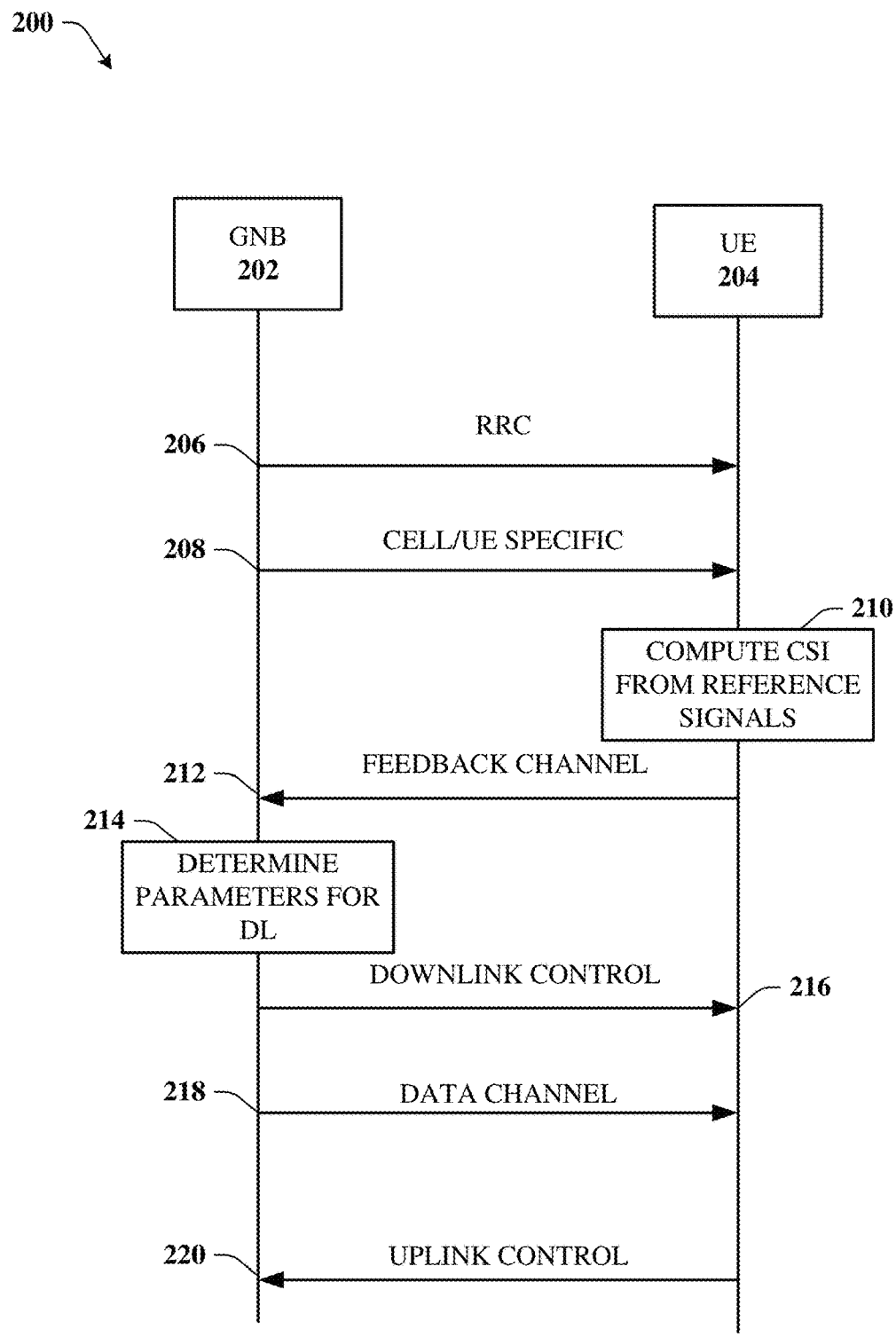
FIG. 2 illustrates an example message sequence chart in accordance with various aspects and embodiments of the subject disclosure.

Turning now to FIG. 2, illustrated is an example message sequence chart 200 in accordance with various aspects and embodiments of the subject disclosure.

In an embodiment, the GNB 202 can configure the UE 204 via a radio resource control signaling at 206 with the type of CAZAC sequence to use, and the type of PUCCH format to use. Via the RRC signaling at 206, the GNB 202 can configure the UE 204 with sequences for HARQ-ACK and HARQ-NACK such that there are redundant subcarrier symbols for HARQ-ACK and HARQ-NACK so that the redundant symbols can be used as reference symbols for channel estimation by the GNB 202.

At 208 the GNB can transmit one or more cell specific or UE specific reference signals which the UE 204 can use to compute the CSI at 210, and then the UE 204 can transmit the CSI information via a feedback channel 212. At 214, the GNB 202 can determine parameters for a downlink channel, and inform the UE 204 of the parameters via a downlink control channel at 216. At 218, the GNB can transmit the data to the UE 204 via the data channel.

If the UE 204 successfully decodes the data in the data channel 218, the UE 204 send a HARQ-ACK message to GNB 202 via uplink control channel 220. If the UE 204 does not successfully decode the data in the data channel 218, the UE 204 send a HARQ-NACK message to GNB 202 via uplink control channel 220.

Figure 3:
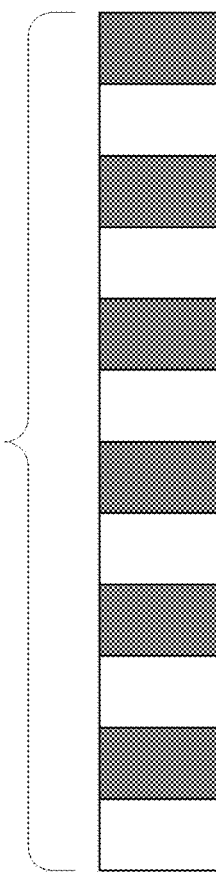
FIG. 3 illustrates an example block diagrams of an acknowledgement and negative acknowledgement sequences in accordance with various aspects and embodiments of the subject disclosure.
Figure 3:
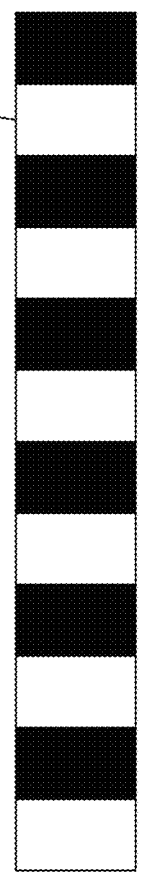

As can be seen in FIG. 3, a HARQ-ACK transmission 302 and HARQ NACK transmission 304 have twelve resource elements (or subcarrier symbols) that make up 1 OFDM symbol. Note that NR specification allows sequence length equal to 24 (2 OFDM symbols), and while FIG. 3 depicts messages with 1 OFDM symbol, in other embodiments there may be 2 OFDM symbols with 24 total subcarrier symbols.

HARQ-ACK 302 and HARQ-NACK 304 have even numbered (e.g., resource element #2 at 306) symbols that are the same in each of the types of messages 302 and 304 based on the CAZAC sequence selected. Other CAZAC sequences may have different numbers of resource elements that match each other. The UE can use these symbols instead as reference signals/symbols for the base station device to use for channel estimation.

Once the network estimates the channel on these symbols, it interpolates these channel estimates on those resources, e.g., the white blocks of which 306 is an example, for estimating the channel on these symbols. Once the network estimates the channel on the known symbols, it will use coherent detection to detect the unknown symbols and decide whether the UE transmitted HARQ-ACK or HARQ-NAK, by identifying the symbols in the locations that differ based on whether HARQ-ACK or HARQ-NACK is selected.

The steps involved in determining the HARQ-ACK or NAK is as follows:

Step 1: Estimate the channel on the common resource elements for HARQ-ACK and HARQ-NAK Step 2: Interpolate the channel estimates on the resources where the sequences differ.

Step 3: Once the channel estimation of PUCCH resources done, use maximum likelihood metric to choose between HARQ-ACK or HARQ-NAK as follows $$z1 = \|R - Hx1\|^2$$

$$z2 = \|R - Hx2\|^2 \qquad \text{Equation 1:}$$

If z1<z2, HARQ-ACK was chosen else HARQ-NAKC will be selected. In the above equation, R is the received signal, H is the channel estimated from the reference signal (and interpolated), x1 is the CAZAC sequence corresponding to the HARQ-ACK, and x2 is the CAZAC sequence corresponding to HARQ-NAK.

Figure 4:
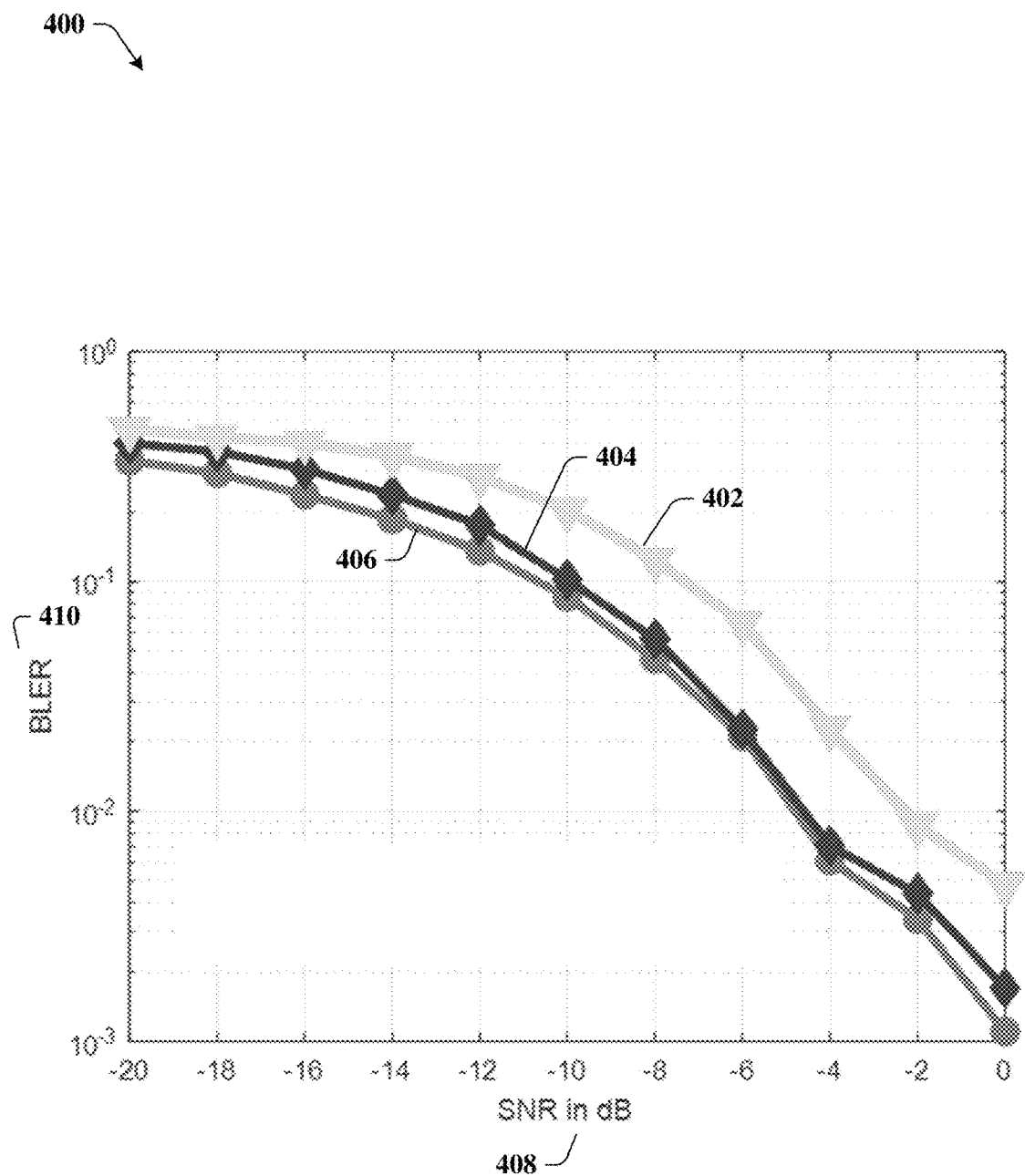
FIG. 4 illustrates an example graph showing performance of the joint channel estimation and data decoding technique in accordance with various aspects and embodiments of the subject disclosure.

Turning now to FIG. 4, illustrated is an example graph 400 showing performance of the joint channel estimation and data decoding technique in accordance with various aspects and embodiments of the subject disclosure.

The horizontal axis 408 of the graph 408 is SNR in decibels, while the vertical axis 410 is the block error rate. A lower block error rate having a higher performance for a given SNR. Plotline 402 is non-coherent detection without channel estimation (traditional method), while plotline 406 is coherent detection with ideal channel estimation. Plotline 404 is the proposed method of coherent detection as disclosed herein, and as shown is about a 2.5 dB SNR gain using the proposed technique over the traditional method.

Figure 5:
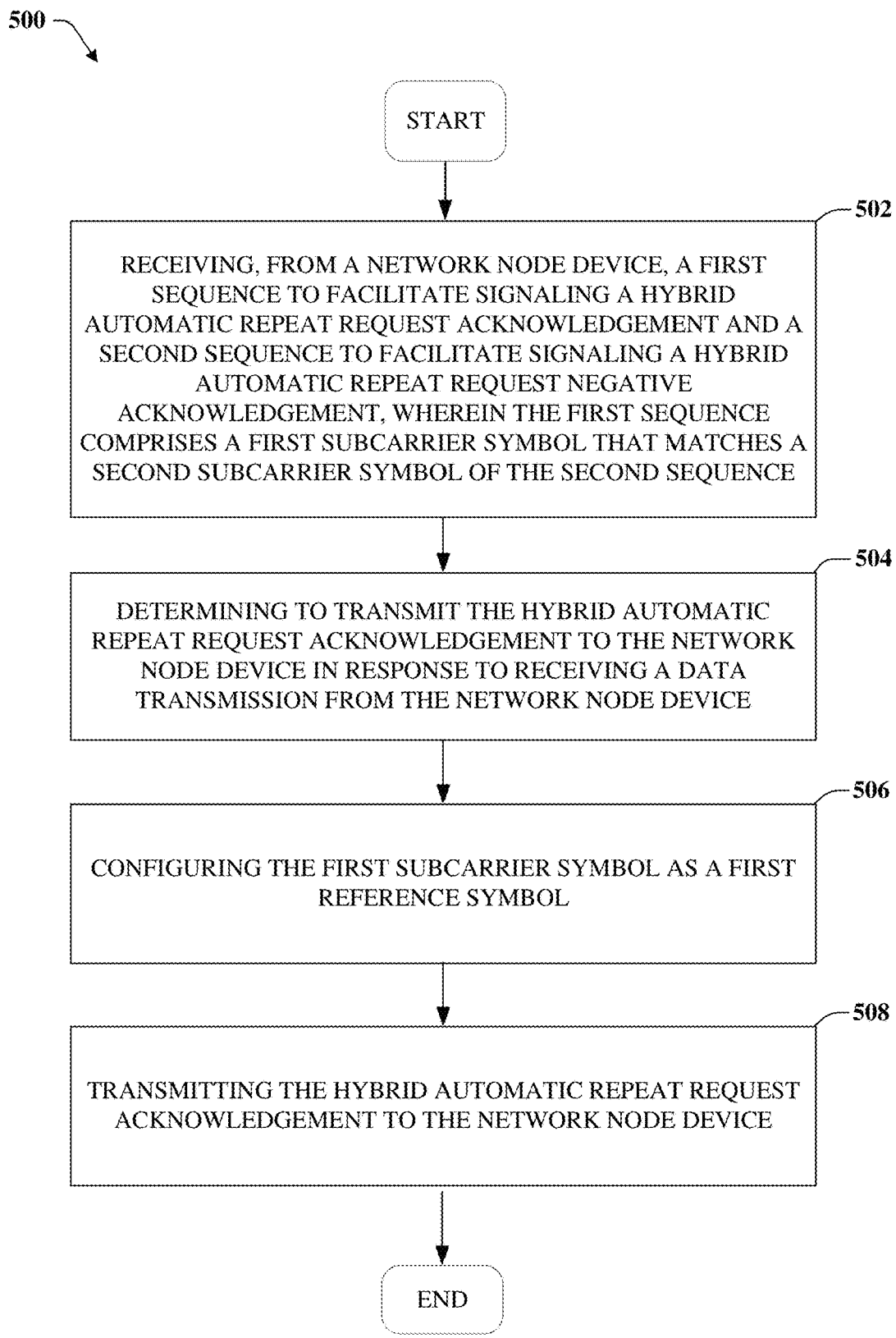
FIG. 5 illustrates an example method for encoding acknowledgement and negative acknowledgement transmissions in accordance with various aspects and embodiments of the subject disclosure.
Figure 6:
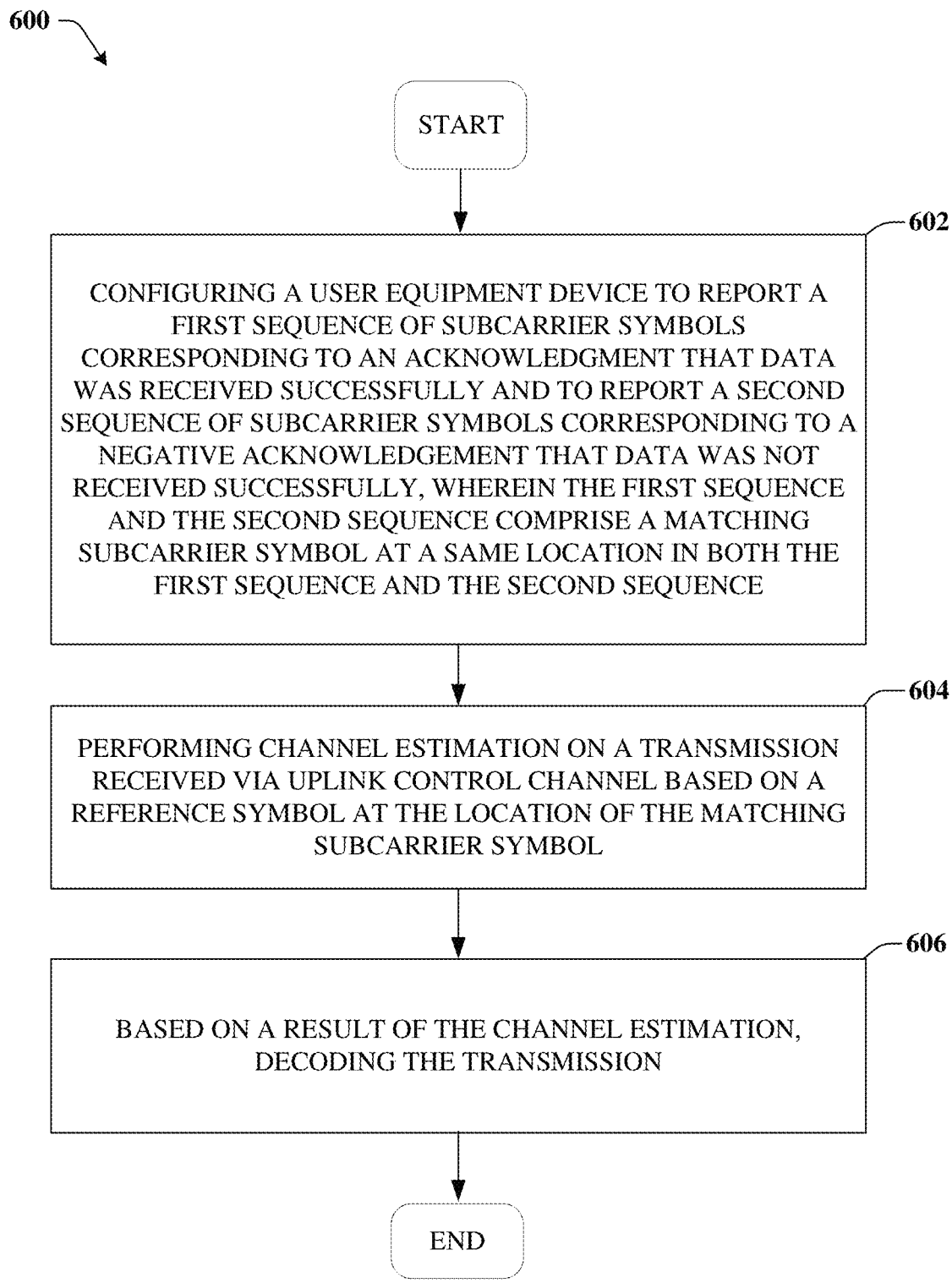
FIG. 6 illustrates an example method for performing joint channel estimation data decoding of an uplink control channel in accordance with various aspects and embodiments of the subject disclosure.
Figure 7:
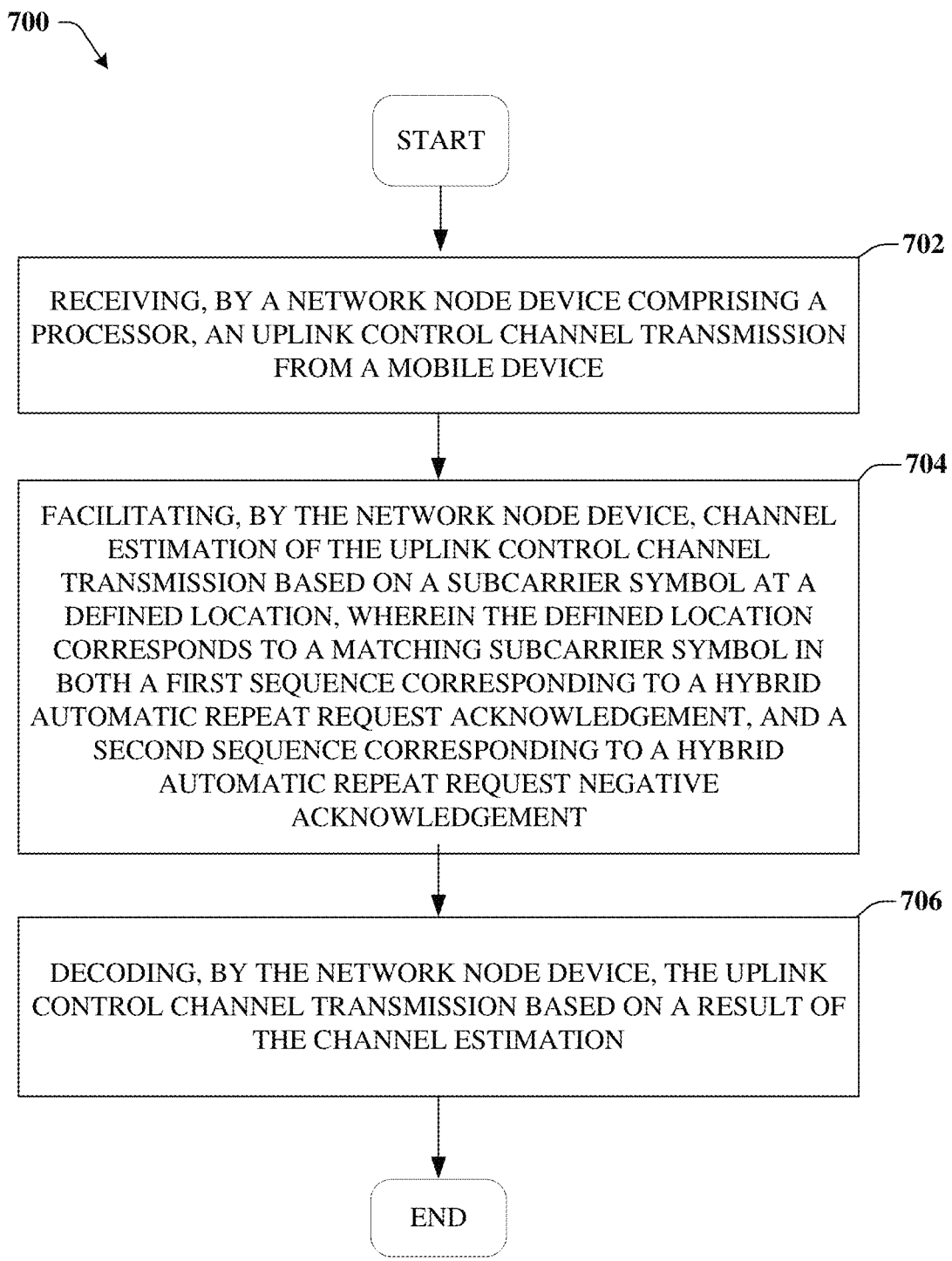
FIG. 7 illustrates an example method for performing joint channel estimation data decoding of an uplink control channel in accordance with various aspects and embodiments of the subject disclosure.

FIGS. 5-7 illustrates a process in connection with the aforementioned systems. The processes in FIGS. 5-7 can be implemented for example by the systems in FIGS. 1-4 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 5 illustrates an example method 500 for encoding acknowledgement and negative acknowledgement transmissions in accordance with various aspects and embodiments of the subject disclosure Method 500 can begin at 502 where the method includes receiving, from a network node device, a first sequence to facilitate signaling a hybrid automatic repeat request acknowledgement and a second sequence to facilitate signaling a hybrid automatic repeat request negative acknowledgement, wherein the first sequence comprises a first subcarrier symbol that matches a second subcarrier symbol of the second sequence.

At 504, the method includes determining to transmit the hybrid automatic repeat request acknowledgement to the network node device in response to receiving a data transmission from the network node device.

At 506, the method includes configuring the first subcarrier symbol as a first reference symbol.

At 508, the method includes transmitting the hybrid automatic repeat request acknowledgement to the network node device.

FIG. 6 illustrates an example method 600 for performing joint channel estimation data decoding of an uplink control channel in accordance with various aspects and embodiments of the subject disclosure.

Method 600 can begin at 602 where the method includes configuring a user equipment device to report a first sequence of subcarrier symbols corresponding to an acknowledgment that data was received successfully and to report a second sequence of subcarrier symbols corresponding to a negative acknowledgement that data was not received successfully, wherein the first sequence and the second sequence comprise a matching subcarrier symbol at a same location in both the first sequence and the second sequence.

At 604, the method includes performing channel estimation on a transmission received via uplink control channel based on a reference symbol at the location of the matching subcarrier symbol.

At 606, the method includes, based on a result of the channel estimation, decoding the transmission.

FIG. 7 illustrates an example method 700 for performing joint channel estimation data decoding of an uplink control channel in accordance with various aspects and embodiments of the subject disclosure.

Method 700 can begin at 702 where the method includes receiving, by a network node device comprising a processor, an uplink control channel transmission from a mobile device.

At 704, the method includes facilitating, by the network node device, channel estimation of the uplink control channel transmission based on a subcarrier symbol at a defined location, wherein the defined location corresponds to a matching subcarrier symbol in both a first sequence corresponding to a hybrid automatic repeat request acknowledgement, and a second sequence corresponding to a hybrid automatic repeat request negative acknowledgement.

At 706, the method includes decoding, by the network node device, the uplink control channel transmission based on a result of the channel estimation.

Figure 8:
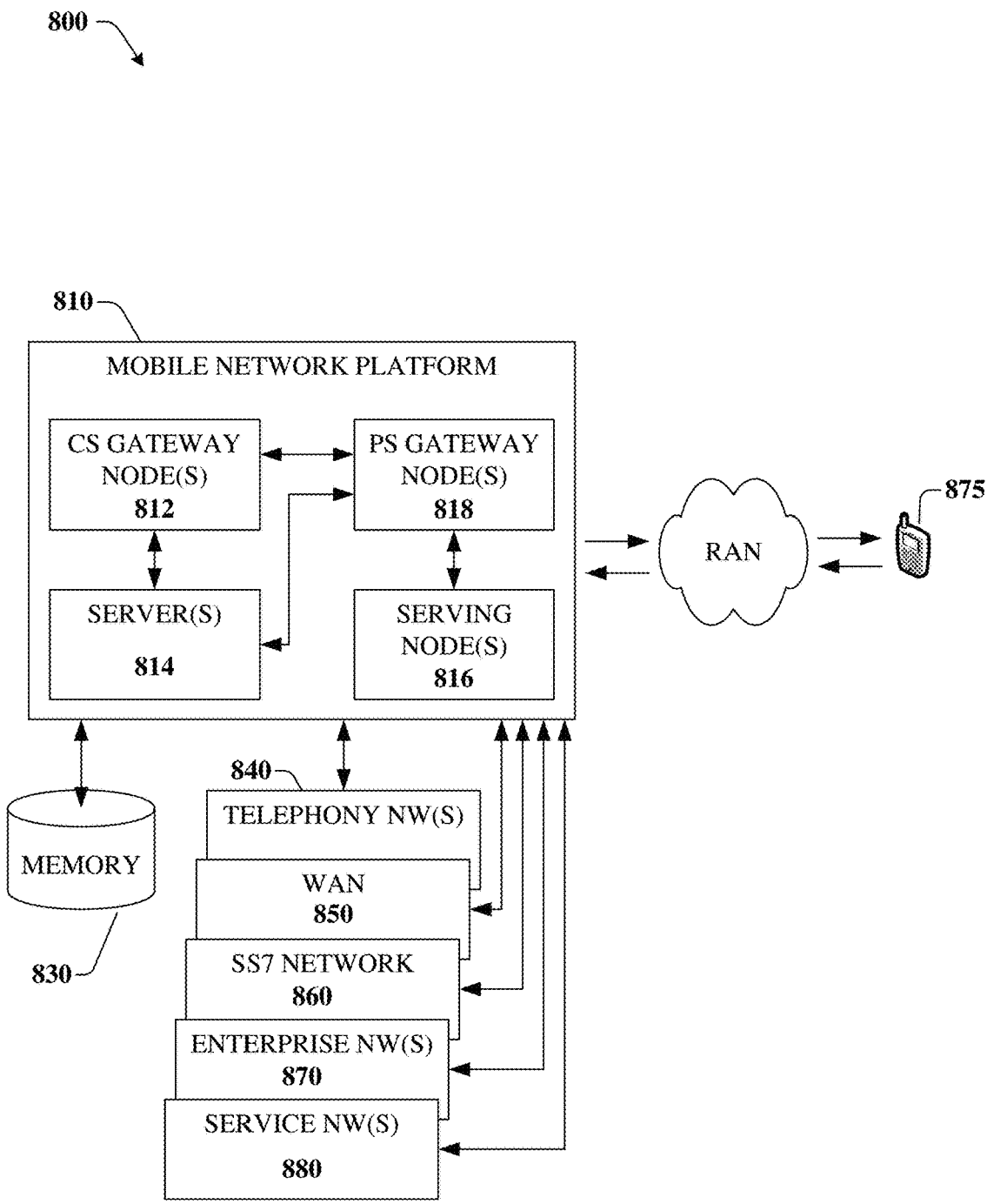
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as WI-FI™ networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
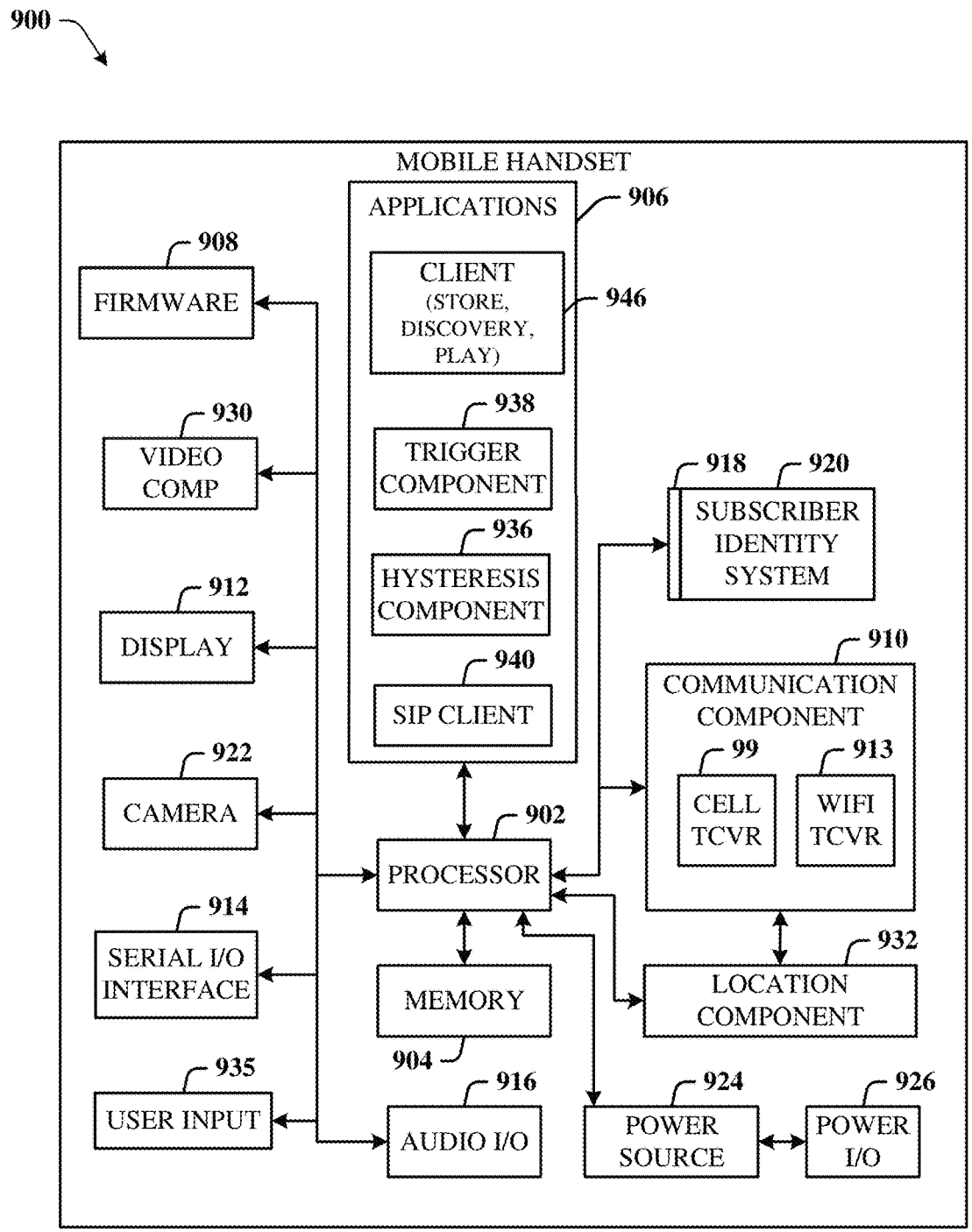
FIG. 9 illustrates an example block diagram of an example user equipment that can be a mobile handset in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., WIMAX™ for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the WI-FI™ transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., WI-FI™ transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
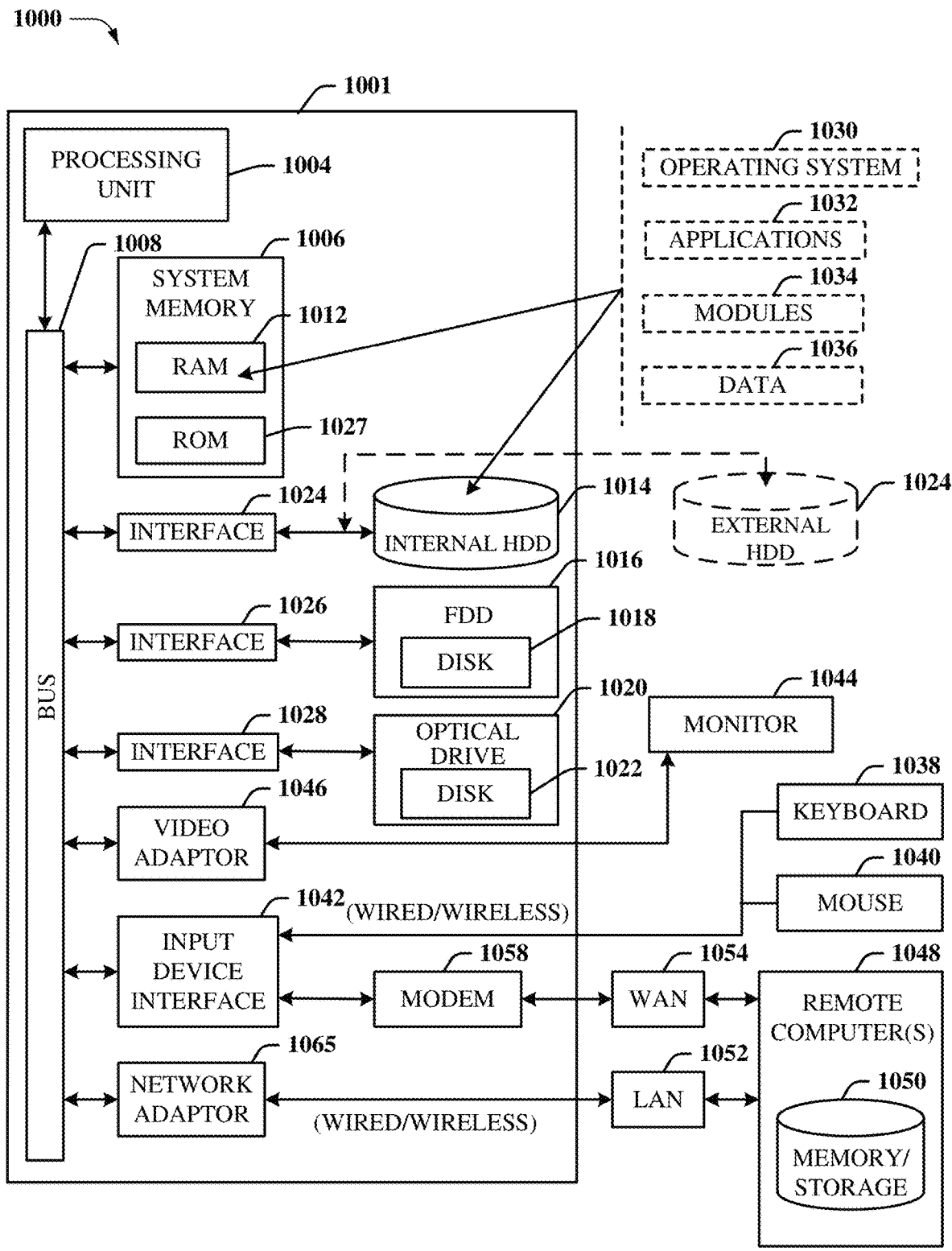
FIG. 10 illustrates an example block diagram of a computer that can be operable to execute processes and methods in accordance with various aspects and embodiments of the subject disclosure

Referring now to FIG. 10, there is illustrated a block diagram of a computer 1000 operable to execute the functions and operations performed in the described example embodiments. For example, a network node (e.g., network node 106, GNB 202, etc.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WI-FI™ and Bluetooth™ wireless technologies. Thus, the communication can be a predefined structure as with a conventional network or simply an ad hoc communication between at least two devices.

WI-FI™, or Wireless Fidelity, allows connection to the Internet from a couch at home, a bed in a hotel room, or a conference room at work, without wires. WI-FI™ is a wireless technology similar to that used in a cell phone that enables such devices, e.g., computers, to send and receive data indoors and out; anywhere within the range of a base station. WI-FI™ networks use radio technologies called IEEE802.11 (a, b, g, n, etc.) to provide secure, reliable, fast wireless connectivity. A WI-FI™ network can be used to connect computers to each other, to the Internet, and to wired networks (which use IEEE802.3 or Ethernet). WI-FI™ networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment device, comprising:
a processor; and
a memory that stores executable instructions that, when executed by the processor, facilitate performance of operations, comprising:
receiving, from a network node device, a first sequence to facilitate signaling a hybrid automatic repeat request acknowledgement and a second sequence to facilitate signaling a hybrid automatic repeat request negative acknowledgement, wherein the first sequence comprises a first subcarrier symbol that matches a second subcarrier symbol of the second sequence;
determining to transmit the hybrid automatic repeat request acknowledgement to the network node device in response to receiving a first data transmission from the network node device;
configuring the first subcarrier symbol as a first reference symbol; and
transmitting the hybrid automatic repeat request acknowledgement to the network node device.

2. The user equipment device of claim 1, wherein the operations further comprise:
determining to transmit a hybrid automatic repeat request negative acknowledgement to the network node device in response to receiving a second data transmission from the network node device; and
configuring the second subcarrier symbol as a second reference symbol.

3. The user equipment device of claim 1, wherein the receiving the first sequence and the second sequence is via radio resource control signaling.

4. The user equipment device of claim 1, wherein the transmitting the hybrid automatic repeat request acknowledgement is via a physical uplink control channel.

5. The user equipment device of claim 4, wherein the physical uplink control channel is less than or equal to two bits.

6. The user equipment device of claim 1, wherein the operations further comprise:
   determining a location of the first reference symbol based on the first sequence.

7. A network node device comprising:
   a processor; and
   a memory that stores executable instructions that, when executed by the processor, facilitate performance of operations, comprising:
      transmitting, to a user equipment device, a first sequence of subcarrier symbols corresponding to signaling of a hybrid automatic repeat request acknowledgment by the user equipment device and a second sequence of subcarrier symbols corresponding to signaling of a hybrid automatic repeat request negative acknowledgement by the user equipment device, wherein the first sequence and the second sequence comprise a matching subcarrier symbol;
      performing channel estimation on a transmission received via an uplink control channel based on a reference symbol at a location of the matching subcarrier symbol; and
      based on a result of the channel estimation, decoding the transmission.

8. The network node device of claim 7, wherein the configuring is via radio resource control signaling.

9. The network node device of claim 7, wherein the transmission is less than or equal to two bits.

10. The network node device of claim 7, wherein the decoding the transmission is performed via coherent detection.

11. The network node device of claim 7, wherein the operations further comprise, in response to the decoding the transmission, determining whether the user equipment device successfully received the data.

12. The network node device of claim 7, wherein the first sequence and the second sequence comprise a group of matching subcarrier symbols comprising the matching subcarrier symbol.

13. The network node device of claim 7, wherein the first sequence and the second sequence are constant amplitude zero autocorrelation waveform sequences.

14. A method, comprising:
    receiving, by a network node device comprising a processor, an uplink control channel transmission from a mobile device;
    facilitating, by the network node device, a channel estimation of the uplink control channel transmission based on a matching subcarrier symbol in both a first sequence corresponding to signaling of a hybrid automatic repeat request acknowledgement by the mobile device, and a second sequence corresponding to signaling of a hybrid automatic repeat request negative acknowledgement by the mobile device, the first sequence and the second sequence being transmitted to the mobile device by the network node device; and
    decoding, by the network node device, the uplink control channel transmission based on a result of the channel estimation.

15. The method of claim 14, further comprising:
    configuring, by the network node device, the mobile device via radio resource control signaling.

16. The method of claim 14, wherein the uplink control channel transmission comprises less than or equal to two bits.

17. The method of claim 14, wherein the decoding comprises decoding the uplink control channel transmission via coherent detection.

18. The method of claim 14, further comprising, in response to decoding the uplink control channel transmission, determining, by the network node device, whether the mobile device successfully received a data transmission.

19. The method of claim 14, wherein the first sequence and the second sequence comprise a group of matching subcarrier symbols.

20. The method of claim 14, wherein the first sequence and the second sequence are constant amplitude zero autocorrelation waveform sequences.

* * * * *